United States Patent
Coïc et al.

(10) Patent No.: US 10,112,363 B2
(45) Date of Patent: Oct. 30, 2018

(54) POLYGONAL PART HAVING CAVITIES FOR A PANEL CORE, IN PARTICULAR OF A SATELLITE ANTENNA REFLECTOR

(71) Applicant: AIRBUS SAFRAN LAUNCHERS SAS, Issy-les-Moulineaux (FR)

(72) Inventors: Jean-Sébastien Coïc, Triel sur Seine (FR); Pierre Baudry, Merignac (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 15/303,493

(22) PCT Filed: Apr. 7, 2015

(86) PCT No.: PCT/FR2015/000074
§ 371 (c)(1),
(2) Date: Oct. 11, 2016

(87) PCT Pub. No.: WO2015/158966
PCT Pub. Date: Oct. 22, 2015

(65) Prior Publication Data
US 2017/0043550 A1    Feb. 16, 2017

(30) Foreign Application Priority Data

Apr. 14, 2014   (FR) .................................... 14 00890

(51) Int. Cl.
*B23B 3/12*    (2006.01)
*B32B 3/12*    (2006.01)
(Continued)

(52) U.S. Cl.
CPC .............. *B32B 3/12* (2013.01); *B29C 65/565* (2013.01); *B29C 66/2274* (2013.01);
(Continued)

(58) Field of Classification Search
CPC ........................................................ B32B 3/12
(Continued)

(56) References Cited

U.S. PATENT DOCUMENTS 4,287,693 A * 9/1981 Collette ............. A47G 27/0212
52/177
2014/0064833 A1 3/2014 Reeves et al.

FOREIGN PATENT DOCUMENTS

EP          2407303 A1    1/2012
WO    2005013421 A1    2/2005
(Continued)

OTHER PUBLICATIONS

International Search Report, International Application No. PCT/FR2015/000074, dated Jun. 16, 2015.

*Primary Examiner* — Brett T O'Hern
(74) *Attorney, Agent, or Firm* — Koppel, Patrick, Heybl & Philpott

(57) ABSTRACT

The polygonal part (1) has, on each side (C1 to C6), at least one of the following assembly elements: at least one lug (3), at least one recess (4), each of said lugs (3) and each of said recesses (4) of the part (1) having a trapezoidal shape, with in each case complementary shapes, the trapezium of each of said lugs (3) widening towards the outside of the part (1) and the trapezium of each of said recesses (4) widening towards the inside of the part (1), and each of said lugs (3) having a width, defined transversely with respect to a right bisector of the corresponding trapezium, which is greater than the width of each of said recesses (4).

9 Claims, 3 Drawing Sheets

(51) Int. Cl.
- *B29C 65/00* (2006.01)
- *B32B 3/06* (2006.01)
- *B29D 99/00* (2010.01)
- *B29C 65/56* (2006.01)
- *B32B 5/02* (2006.01)
- *B32B 27/38* (2006.01)
- *H01Q 1/28* (2006.01)
- *H01Q 15/14* (2006.01)
- *F16B 3/00* (2006.01)
- *F16B 5/01* (2006.01)
- *F16B 5/07* (2006.01)
- *B29L 31/60* (2006.01)
- *F16B 5/00* (2006.01)
- *B29L 31/34* (2006.01)

(52) U.S. Cl.
CPC ...... *B29C 66/7254* (2013.01); *B29D 99/0089* (2013.01); *B32B 3/06* (2013.01); *B32B 5/02* (2013.01); *B32B 27/38* (2013.01); *H01Q 1/288* (2013.01); *H01Q 15/141* (2013.01); *B29C 65/56* (2013.01); *B29C 66/1122* (2013.01); *B29C 66/53462* (2013.01); *B29C 66/71* (2013.01); *B29C 66/7212* (2013.01); *B29L 2031/3456* (2013.01); *B29L 2031/608* (2013.01); *B32B 2262/106* (2013.01); *B32B 2363/00* (2013.01); *B32B 2457/00* (2013.01); *F16B 3/00* (2013.01); *F16B 5/0056* (2013.01); *F16B 5/01* (2013.01); *F16B 5/07* (2013.01)

(58) Field of Classification Search
USPC .......................................................... 428/33
See application file for complete search history.

(56) References Cited

FOREIGN PATENT DOCUMENTS

| WO | 2007002442 A1 | 1/2007 |
| WO | 2008148537 A1 | 12/2008 |

* cited by examiner

POLYGONAL PART HAVING CAVITIES FOR A PANEL CORE, IN PARTICULAR OF A SATELLITE ANTENNA REFLECTOR

The present invention relates to a polygonal part having cavities for a panel core, in particular of a satellite antenna reflector.

The present invention is applicable more particularly, although not exclusively, to a structure of an antenna reflector of a telecommunications satellite, in particular of an antenna reflector of large size. An antenna reflector of this kind generally comprises a structure or rigid panel (called a shell) provided with a reflective surface and reinforcement means behind this surface, which play a part in supporting the shell and in the connection with the satellite.

It is known that satellite reflector shells, in general, consist of a composite sandwich structure comprising a honeycomb core (structural and transparent to radio waves) reinforced by two skins pre-impregnated with carbon fibres and resin. The honeycomb core increases the strength of the shell while ensuring maximum lightness.

During the manufacture of the shell, the honeycomb core, which has for example a diameter of around two to three meters, is produced manually by an operator, by assembling together a plurality of hexagonal honeycomb parts, the dimensions of which generally vary depending on the profile of the shell. These hexagonal parts comprise hexagonal cavities. The different parts are assembled by opening the peripheral cells (or cavities), and interlocking the open cells of two adjacent parts that have to be assembled together.

Manual assembly of the hexagonal parts comprising hexagonal cavities therefore means, in particular:

manual opening by an operator of the peripheral cells or cavities of the parts; and manual interlocking by the operator of the open cavities of two adjacent parts.

Because of the large number of parts and the small size of the cavities (to be opened and interlocked), an assembly of this kind is long, and requires significant effort by the operator, producing, in particular, significant visual fatigue.

The aim of the present invention is to remedy this disadvantage. The invention relates to a part intended for a panel core, in particular for a satellite antenna reflector, said part being substantially plane and having a polygonal shape with cavities.

According to the invention, each side of the polygonal part features at least one of the following assembly elements: at least one lug, at least one recess, each of said lugs and each of said recesses of the part having a trapezoidal shape, with in each case complementary shapes, the trapezium of each of said lugs widening towards the outside of the part and the trapezium of each of said recesses widening towards the inside of the part, and each of said lugs has a width defined transversely to a perpendicular bisector of the corresponding trapezium, which is greater than or equal to the width of each of said recesses.

Thus, by virtue of the arrangement of complementary lugs and recesses on the parts, it is possible to carry out an easy, quick manual assembly of the parts, without opening cavities, as detailed below. In particular, a very significant saving in terms of cost and assembly time is thus achieved, as is also detailed below.

Preferably:

the different lugs of the part are identical, and the different recesses of the part are also identical; and each of said lugs and each of said recesses of the part has the shape of an isosceles trapezium.

Usually, a trapezium is a quadrilateral, having two opposite parallel sides, called bases, and an isosceles trapezium is such that both bases of the trapezium have a single perpendicular bisector, which is an axis of symmetry of the trapezium.

Furthermore, said part has at least some of the following features, taken individually or in combination:

the width of said lugs is included in a defined range of widths between 100% and 150% of the width of said recesses;

said lugs have a length defined along a perpendicular bisector of the corresponding trapezium, which is less than or equal to the length of said recesses;

each side of the part features at least two assembly elements, preferably at least two identical lugs or at least two identical recesses. Advantageously, each side of the part features the same assembly elements (namely either lugs or recesses); and the part has a generally hexagonal shape.

The present invention also relates to:

a panel core comprising a plurality of parts like that mentioned above, which are assembled together;

a satellite antenna reflector, comprising such a (panel) core and two skins arranged either side of the core; and a satellite, featuring an antenna reflector of this kind.

The present invention further relates to a method for manufacturing a panel core, in particular for a satellite antenna reflector, using core parts such as the part mentioned above, said method consisting at least of:

a) producing a plurality of core parts; and b) assembling said core parts together so as to form a structure element representing said panel core, the assembly consisting of connecting together adjacent parts of the core at interacting sides.

According to the invention, at step b), for each pair of interacting sides of two adjacent core parts, all the lugs of the side of one of said parts is inserted into all the complementary recesses of the interacting side of the other of said parts.

This manufacturing method assembly process makes it possible to achieve financial savings in comparison with a usual method of assembly requiring the cavities to be opened. In particular, it enables the assembly time to be reduced. At the same time, it enables the effort at the workstation to be reduced and it has a positive impact on the ergonomics of the workstation: visual fatigue is reduced by simplifying the interlocking.

The figures in the appended drawing will give a clear understanding as to how the invention can be embodied. In these figures, identical references designate similar elements.

Figure 1:
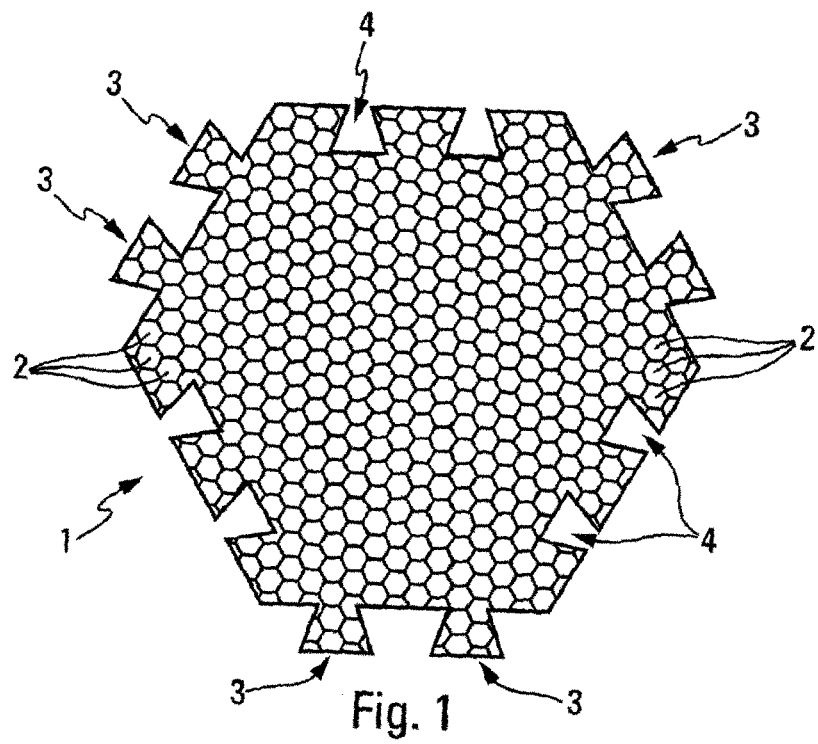
FIG. 1 is a plane diagrammatic view of a hexagonal part with cavities illustrating the invention.

The part 1, illustrating the invention and represented diagrammatically in FIG. 1 in particular, is a core part intended to be used to form a panel core 10 (FIG. 5), in particular for a satellite antenna reflector, as detailed below.

Figure 2:
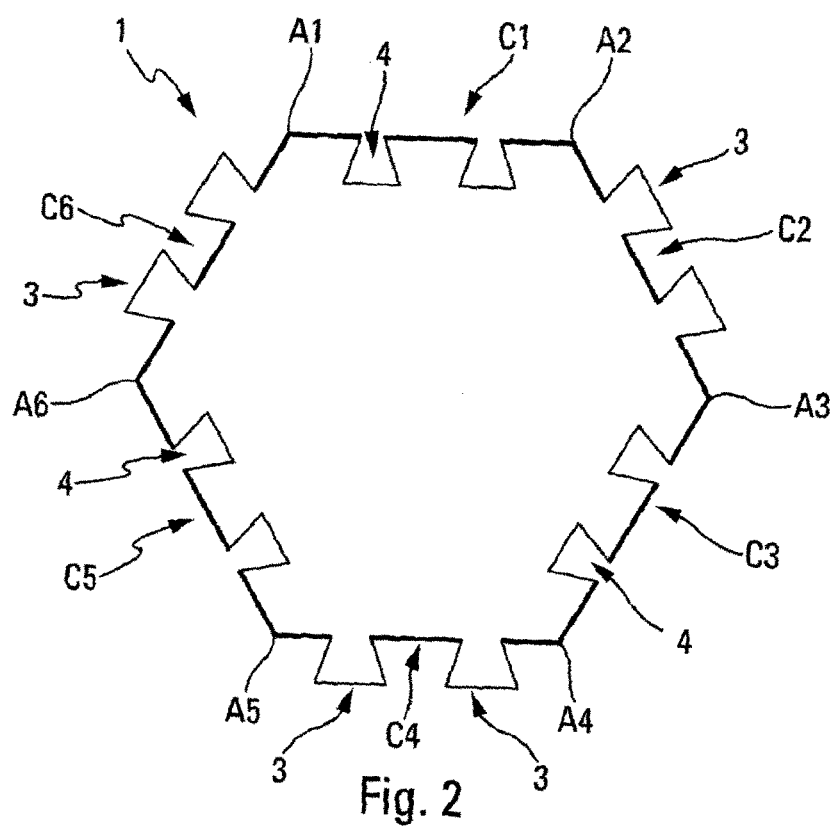
FIG. 2 is a diagrammatic view similar to that of FIG. 1, without cavities in order to make the features of the part clearly visible.

This part 1 is substantially plane and has a generally polygonal shape, in this case a generally hexagonal shape of sides C1 to C6 defined between vertices A1 to A6 respectively, as shown in FIG. 2. This part 1 is made of a material that has a certain flexibility.

This part 1 features a honeycomb structure provided with a plurality of hexagonal cavities 2. These hexagonal cavities, although always present in the part 1, have not been shown in the examples in FIGS. 2, 5 and 7 in order to avoid overloading these figures.

Each side C1 to C6 of the polygonal part 1 features at least one of the following assembly elements: at least one lug 3, at least one recess 4. Each of said lugs 3 and each of said recesses 4 of the part 1 are made in the form of trapeziums, of respectively complementary shapes.

In the context of the present invention, complementary shapes means that the lugs 3 and the recesses 4 have respective shapes enabling a lug 3 of one part to be inserted into a recess 4 of another part.

Figure 5:
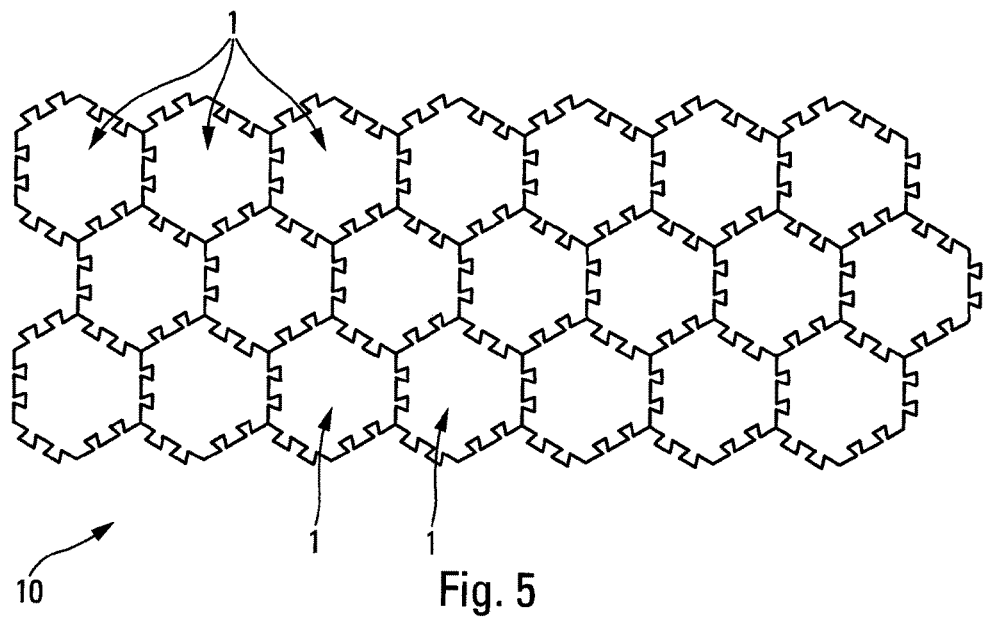
FIG. 5 is a plane diagrammatic view of a structure core formed by a plurality of parts such as that shown in FIG. 2.

In addition to the complementary shape, the positions of the lugs 3 and recesses 4 on the part 1 are also complementary so that an assembly forming a panel core 10 like that shown in FIG. 5 can be produced. The same is the case for their sizes so that the lug 3 can be held in the recess 4, as detailed below.

Figure 3:
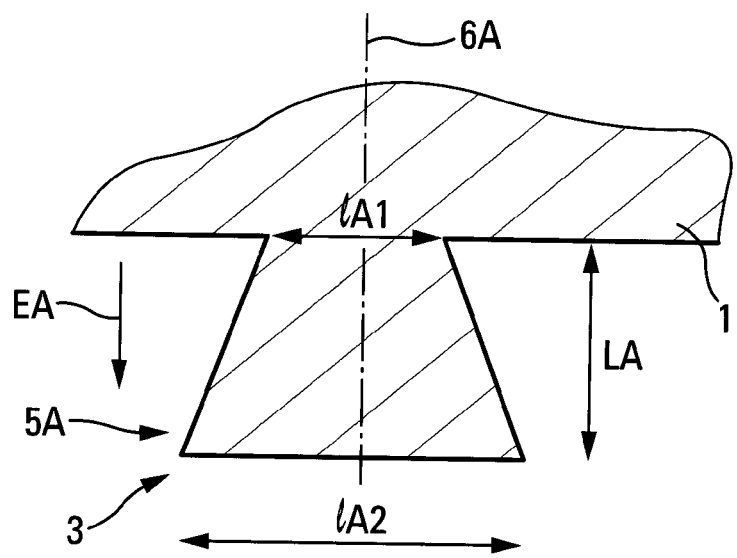
FIGS. 3 and 4 are views in cross-section, of a lug and a recess respectively, of a polygonal part.
Figure 4:
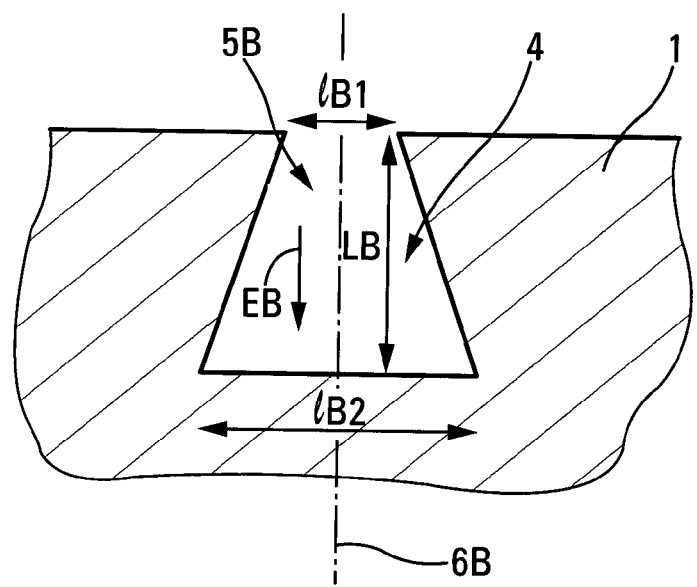

Each trapezium 5A of a lug 3 widens towards the outside of the part 1, in a direction EA, as shown in FIG. 3. In addition, each trapezium 5B of a recess 4 widens towards the inside of the part, in a direction EB, as shown in FIG. 4.

Furthermore:
the different lugs 3 of the part 1 are all identical, and the different recesses 4 of the part 1 are also all identical; and
each of said lugs 3 and each of said recesses 4 of the part have the shape of an isosceles trapezium 5A, 5B.

Usually, a trapezium is a quadrilateral that has two opposite parallel sides, called bases, and an isosceles trapezium 5A, 5B is such that both bases of the trapezium 5A, 5B have the same perpendicular bisector 6A, 6B, which is an axis of symmetry of the trapezium 5A, 5B.

Thus, by virtue of an implementation of the shape (precut) of the part 1, with complementary lugs 3 and recesses 4 (or with positive and negative dovetails), it is possible to perform an easy and quick manual assembly of such parts 1, while maintaining, in particular, the orientations of the honeycomb structure, without opening the cavities 2, as detailed below. Thus, a very significant saving is achieved in terms of cost and assembly time (and therefore of production). A saving is also achieved in terms of workstation ergonomics and work in progress.

As shown in FIG. 3, each lug 3 has a first width l1A (size of the shorter base) and a second width lA2 (size of the longer base), transverse to the common perpendicular bisector 6A (or axis of symmetry), and a length LA along the axis of symmetry 6A.

Similarly, as shown in FIG. 4, each recess 4 has a first width lB1 (size of the shorter base) and a second width lB2 (size of the longer base), transverse to the common perpendicular bisector 6B (or axis of symmetry), and a length LB along the axis of symmetry 6B.

In a preferred embodiment, the width lA1, for example 16 mm, is greater than the width lB1, for example 10 mm, and the width lA2, for example 31 mm, is greater than the width lB2, for example 25 mm, so as to allow a stability when a lug 3 (wider) is inserted into a recess 4 (narrower). To allow the insertion, the part 1 is made of a material that has a certain flexibility.

In a particular embodiment, the width of the lugs 3 (particularly the lug 3 similar in shape to a recess 4 along the axis of symmetry) is included in a defined range of widths between 100% and 150% of the width of the recesses 4.

In addition, in a preferred embodiment, the length LA (along the axis of symmetry 6A) of a lug 3, for example 20 mm, is less than the length LB (along the axis of symmetry 6B) of a recess 4, for example 22 mm, which prevents longitudinal deformations (along the axis of symmetry) when a lug 3 is inserted in a recess 4.

In a particular embodiment, the length LA of the lugs 3 is included in a defined range of lengths between 75% and 100% of the length LB of the recesses 4.

Each side C1 to C6 of the part 1 can feature a lug 3 or a recess 4. Within the scope of the present invention, it is also possible to envisage the provision on a single side C1 (i=1, . . . , 6) both at least one lug 3 and at least one recess 4.

However, preferably, in particular for reasons of ease of assembly, each side C1 to C6 of the part 1 is provided with a single type of assembly element (lug 3 or recess 4). In this case, preferably, as shown in FIGS. 1 and 2, the adjacent sides comprise alternately and in succession around the part 1, one type of assembly element and then another and so on, namely recesses 4 on C1, lugs 3 on the side C2, recesses 4 on the side C3, lugs 3 on the side C4, etc.

In a preferred embodiment, each side C1 to C06 of the part 1 features a plurality (two, three or more) and preferably two identical lugs 3 or a plurality (two, three or more) and preferably two identical recesses 4. Two lugs 3 or two recesses 4 per side C1 to C6 enables a stable connection to be obtained, while restricting the number of assembly elements, which facilitates the manufacture of the part 1, and also the assembly thereof.

The present invention further relates to a method for manufacturing, using core parts such as the part 1 mentioned above, a panel core 10, as shown in FIG. 5. This panel core 10 is intended in particular for a satellite antenna reflector. An antenna reflector of this kind generally comprises a rigid structure or panel (called a shell) provided with a reflective surface and reinforcement means behind that surface, which play a part in supporting the shell and in the link with the satellite.

Figure 6:
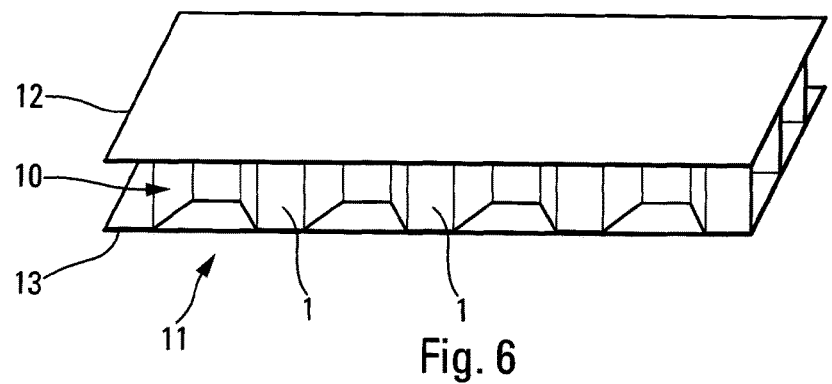
FIG. 6 is a diagrammatic perspective view of a sandwich structure comprising a core such as that shown in FIG. 5

A satellite reflector shell of this kind generally consists of a composite sandwich structure 11 comprising a honeycomb core 10 (structural and transparent to radio waves) reinforced by two skins 12 and 13 pre-impregnated with a carbon fibre-epoxy matrix, as shown in FIG. 6.

To simplify the drawing, the core 10 and the structure 11 are shown with a generally rectangular shape in FIGS. 5 and 6. It will be appreciated that, in the case of an antenna reflector shell, these elements have a generally circular shape, for example with a diameter of around two to three meters.

The method for manufacturing the core 10 comprises in particular the following steps, consisting of:

a) manufacturing, in the usual way, a plurality of parts 1 like the part 1 described above, preferably by producing a cut-out from a honeycomb structure; and b) for an operator, assembling said core parts together manually so as to form a structural element representing the core 10, the assembly operation consisting of connecting the adjacent core parts together at interacting sides.

Figure 7:
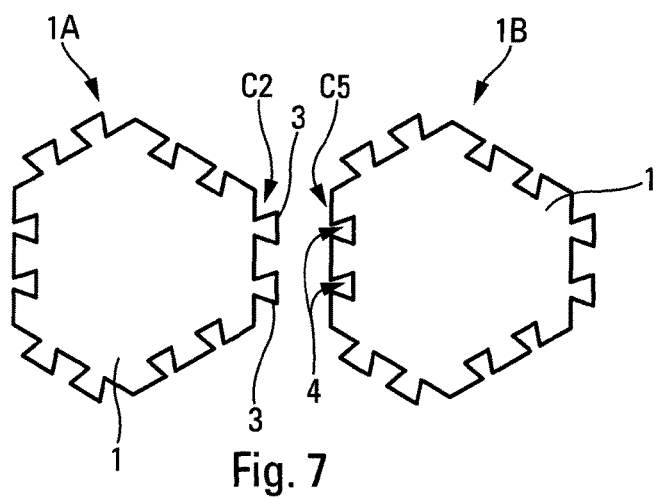
FIG. 7 is a diagrammatic illustration of an assembly of two parts.

According to the invention, at step b), for each pair of interacting sides of two adjacent core parts, as shown in FIG. 7 for two parts 1 referenced 1A and 1B respectively, the lugs 3 of, for example, the side C2 of the part 1A are inserted into the complementarily-shaped recesses 4 of the side C5 interacting with the part 1B.

Step b) consists, for an operator, of:
b1) bringing a lug 3 close to the interacting recess 4;
b2) compressing the lug 3 (which is broader than the recess 4) using a pair of pliers;
b3) inserting the compressed lug 3 in the interacting recess 4; and
b4) performing an adjustment, in order to position the parts 1A and 1B properly relative to one another.

This step b) is performed for all parts 1 of the core 10.

This method of assembly makes it possible to achieve financial savings in comparison with a normal method of assembly requiring opening of the cavities. In particular, it enables the assembly time to be halved. In parallel, it reduces the effort at the workstation and has a positive impact on the ergonomics of the workstation: visual fatigue is reduced by simplifying the interlocking.

The honeycomb structure 10 makes it possible, in particular, to increase the strength of a panel 11 into which it is integrated, while ensuring maximum lightness.

It is understood that, afterwards, the usual treatments are performed, and in particular polymerisation, to obtain the final composite sandwich structure, in particular a satellite reflector shell.

The invention claimed is:

1. A part intended for a panel core, in particular for a satellite antenna reflector, said part being substantially planar and having a polygonal shape with cavities, each side of the part featuring at least one of the following assembly elements: at least one lug, at least one recess, characterised in that each of said at least one lug and each of said at least one recess of the part have a trapezoidal shape, with in each case complementary shapes, the trapezoidal shape of each of said at least one lug widening towards an outside of the part and the trapezoidal shape of each of said at least one recess widening towards an inside of the part, and in that each of said at least one lug has a maximum width defined transversely to a perpendicular bisector of the trapezoidal shape, which is greater than a maximum width of each of said at least one recess.

2. The part according to claim 1, wherein each of said at least one lug is identical, and wherein each of said at least one recess of the part is identical.

3. The part according to claim 1, characterised in that each of said at least one lug and each of said at least one recess of the part has the shape of an isosceles trapezium.

4. The part according to claim 1, characterised in that the width of each of said at least one lug is included in a defined range of widths between 100% and 150% of the width of each of said at least one recess.

5. The part according to claim 1, characterised in that each of said at least one lug has a length defined along a perpendicular bisector of the corresponding trapezoidal shape, which is less than or equal to a length of each of said at least one recess.

6. The part according to claim 1, characterised in that each side of the part features at least two assembly elements.

7. The part according to claim 6, characterised in that each side of the part features the same assembly elements.

8. The part according to claim 1, characterised in that said part has a generally hexagonal shape.

9. A part intended for a panel core, in particular for a satellite antenna reflector, said part being substantially planar and having a polygonal shape with cavities, each side of the part featuring at least one of the following assembly elements: at least one lug, at least one recess, characterised in that each of said at least one lug and each of said at least one recess of the part have a trapezoidal shape, with in each case complementary shapes, the trapezoidal shape of each of said at least one lug widening towards an outside of the part and the trapezoidal shape of each of said at least one recess widening towards an inside of the part, and in that each of said at least one lug has a maximum width defined transversely to a perpendicular bisector of the trapezoidal shape, which is greater than a maximum width of each of said at least one recess, characterised in that said at least one lug has a length defined along a perpendicular bisector of the trapezoidal shape which is less than a length of said at least one recess.

* * * * *